(12) United States Patent
Fuse

(10) Patent No.: US 7,806,794 B2
(45) Date of Patent: Oct. 5, 2010

(54) POWER TRANSMISSION CHAIN AND POWER TRANSMISSION DEVICE

(75) Inventor: Masaru Fuse, Kashihara (JP)

(73) Assignee: JTEKT Corporation, Osaka-shi (JP)

( * ) Notice: Subject to any disclaimer, the term of this patent is extended or adjusted under 35 U.S.C. 154(b) by 632 days.

(21) Appl. No.: 11/494,739

(22) Filed: Jul. 28, 2006

(65) Prior Publication Data

US 2007/0026988 A1 Feb. 1, 2007

(30) Foreign Application Priority Data

Jul. 29, 2005 (JP) .............................. 2005-221569

(51) Int. Cl.
F16G 5/16 (2006.01)
F16G 13/02 (2006.01)
F16G 13/04 (2006.01)

(52) U.S. Cl. ...................... 474/242; 474/201; 474/215; 474/216; 474/229; 474/245; 59/5; 59/78

(58) Field of Classification Search ................ 474/242, 474/245, 215; 59/5, 78; F16G 5/18, 5/00; F16H 9/02, F16H 9/24
See application file for complete search history.

(56) References Cited

U.S. PATENT DOCUMENTS

| 3,916,709 A | * | 11/1975 | Steuer et al. ................ 474/242 |
| 5,728,021 A | * | 3/1998 | van Rooij et al. ........... 474/229 |
| 6,260,345 B1 | * | 7/2001 | Kanehira et al. ................. 59/4 |
| 6,524,204 B2 | * | 2/2003 | Wakabayashi et al. ...... 474/215 |
| 2004/0152549 A1 | * | 8/2004 | Nishimoto et al. .......... 474/214 |
| 2005/0187057 A1 | * | 8/2005 | Lou ........................... 474/245 |
| 2006/0058142 A1 | * | 3/2006 | Hasebe et al. ............... 474/215 |

FOREIGN PATENT DOCUMENTS

| EP | 1 134 452 A2 | 9/2001 |
| JP | 62-234635 | 10/1987 |
| JP | 8-312725 | 11/1996 |
| JP | 2004-301257 | 10/2004 |
| JP | 2005-54940 | 3/2005 |

* cited by examiner

Primary Examiner—Robert A Siconolfi
Assistant Examiner—San Aung
(74) Attorney, Agent, or Firm—Oblon, Spivak, McClelland, Maier & Neustadt, L.L.P.

(57) ABSTRACT

A power transmission chain includes a plurality of links, a plurality of pins, and a plurality of interpieces. By pressing upper and lower edges of the pin into upper and lower edges of a through hole, the pin is connected to the link. The end of the pin which is located at a front end side when the pin is pressed is formed in a shape into which the upper and lower edges of the pin are pressed at the same time.

3 Claims, 3 Drawing Sheets

POWER TRANSMISSION CHAIN AND POWER TRANSMISSION DEVICE

BACKGROUND OF THE INVENTION

The present invention relates to a power transmission chain, and more particularly, to a power transmission chain preferable for a continuously variable transmission (CVT) of an automobile or the like and a power transmission device using this power transmission chain.

As shown in FIG. 5, as a power transmission chain (1), there has been proposed one which includes: a plurality of links (31); a plurality of pins (34) and a plurality of interpieces (35) which are inserted through the links (31) and move in a rolling and contacting manner relatively; wherein the interpiece (35) is set to be shorter than the pin (34), end faces of the pin (34) which are inclined surfaces corresponding to the shapes of conical sheave faces (2c) and (2d) of a fixing sheave (2a) and a movable sheave (2b) of a pulley (2) contact the conical sheave faces (2c) and (2d) in a state where end faces of the interpiece (35) do not contact respective conical sheave faces (2c) and (2d), and power is transmitted by a frictional force caused by this contact (Publication of Japanese Patent Application Laid-open No. 2004-301257).

According to the power transmission chain in the above-mentioned Publication of Japanese Patent Application Laid-open No. 2004-301257, the pin (34) is fixed to the link (31) by pressing; however, when pressing, as shown in FIG. 6, the upper edge (34a) of the front end of the pin (34) enters a through hole (32) of the link (31) previously and depending on the shape, the size, and the pressing condition or the like, a pressing margin is concentrated on a lower edge (34b) of the front end when the lower edge (34b) of the front end enters the through hole (32), and due to this concentration of stresses, this portion (31a) of the link (31) may be transformed or be trimmed.

SUMMARY OF THE INVENTION

An object of the present invention is to provide a power transmission chain and a power transmission device which can relax concentration of stresses generated in a link when pressing and prevent the link from being trimmed and being transformed.

A power transmission chain according to a first invention includes: a plurality of links having through holes through which pins are inserted; and a plurality of pins for connecting the links aligned in a chain width direction each other; and the end faces of the pin contacting sheave faces of a pulley and a power being transmitted by a frictional force caused by this contact; wherein upper and lower edges of the pin are pressed into upper and lower edges of the through hole so as to connect the pin with the link, and an end of the pin which is located at a front end side when the pin is pressed is formed in a shape so that the upper and lower edges of the pin are pressed at a same time.

The pin is formed by a link holding part having an even sectional shape and the link pressed therein and a pulley abutting part formed at opposite ends of the link holding part and having inclined surfaces corresponding to the sheave faces of the pulley.

According to the conventional power transmission chain, the upper edge of the front end of the pin is pressed into the through hole of the link previously and then, the lower edge of the front end of the pin is pressed into the through hole of the link. On the contrary, for example, by deleting the upper end of the pulley abutting part located at the front end side when the pin is pressed, the pin is formed in a shape so that the upper and lower edges of the pin are pressed at the same time. Thus, without being affected by the shape of the end face which is formed so as to fit the sheave faces, the end of the pin is formed in the shape which is appropriate for pressing.

A power transmission chain according to a second invention includes: a plurality of links having through holes through which pins are inserted; and a plurality of pins for connecting the links aligned in a chain width direction each other; and the end faces of the pin contacting sheave faces of a pulley and a power being transmitted by a frictional force caused by this contact; wherein upper and lower edges of the pin are pressed into upper and lower edges of the through hole so as to connect the pin with the link, and the pin is formed by a link holding part having an even sectional shape and the link pressed therein and a pulley abutting part formed at opposite ends of the link holding part and having inclined surfaces corresponding to the sheave faces of the pulley, and an upper edge of the pulley abutting part located at a front end side when the pin is pressed is deleted.

According to the power transmission chains of the first and second inventions, for example, the pin is manufactured in such a manner that a rod or a liner material is provided with a drawing process so as to have a required sectional shape, then, the inclined end face is formed by a press work, and after being provided with a heat treatment, a polishing process is provided so as to make the upper edge at the front end into a no pressed part.

As the shape of the pin, it is preferable that an inclined face having a pressing margin which gradually increases is provided at a border between the upper edge of the pulley abutting part located at the front end side when the pin is pressed and an upper edge of the link holding part, and an inclined face having a pressing margin which gradually increases is also provided at a border between a lower edge of the pulley abutting part located at a front end side when the pin is pressed and a lower edge of the link holding part. Thus, power acting on the upper edge of the front end and power acting on the lower edge of the front end when the pin is pressed become approximately the same. As a result, the pin can be more easily pressed and concentration of stresses when the pin is pressed is relaxed.

For example, the power transmission chain includes a plurality of links having front and back insertion parts through which the pins are inserted; and a plurality of first pins and a plurality of second pins which are aligned back and forth to connect the links which are aligned in a chain width direction so that the front insertion part of one link corresponds to the back insertion part of another link; wherein the first pin and the second pin move in a rolling and contacting manner relatively so as to enable bending in a longitudinal direction of the links.

This power transmission chain is manufactured, for example, by horizontally holding the necessary number of pins on a table, and then, pressing the links one by one or by several pieces collectively.

A power transmission device according to the present invention includes: a first pulley having conical sheave faces; a second pulley having conical sheave faces; and a power transmission chain provided over the first and second pulleys; wherein the power transmission chain is according to any one of the above-described power transmission chains.

This power transmission device becomes one preferable to be used as a continuously variable transmission of an automobile or the like.

According to the power transmission chain and the power transmission device of the present invention, the durability of the link can be improved.

DESCRIPTION OF THE PREFERRED EMBODIMENTS

With reference to the drawings, the embodiments of the present invention will be described below.

Figure 1:
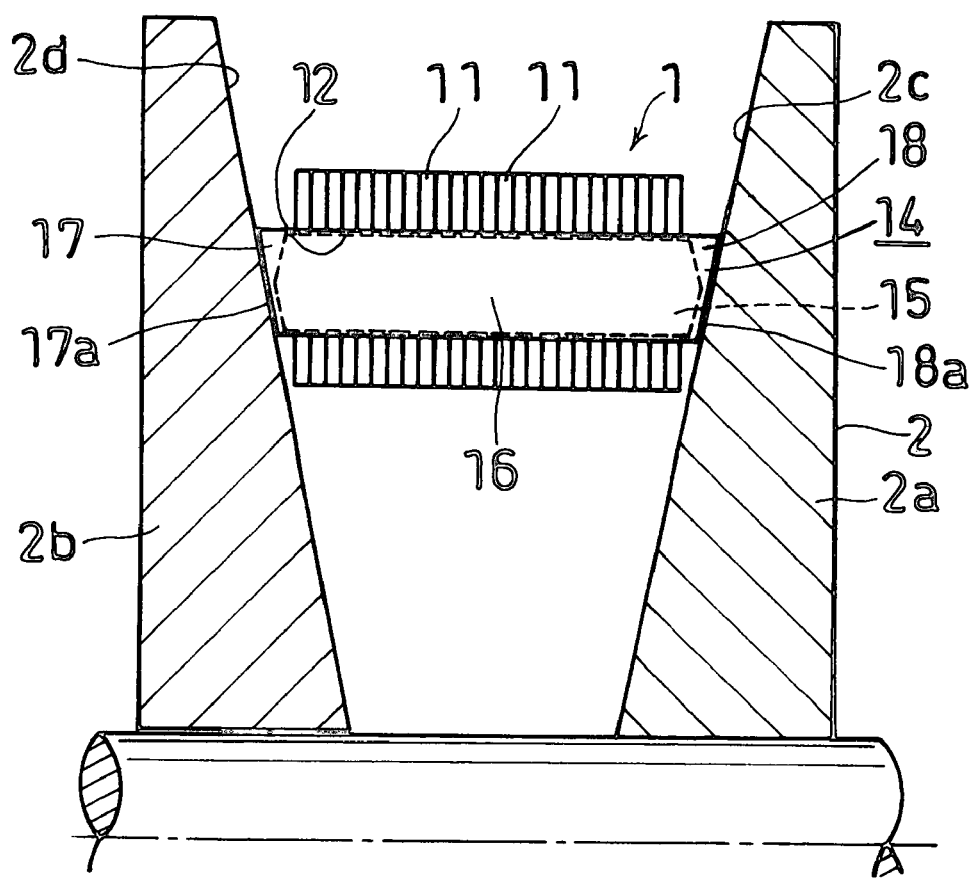
FIG. 1 is a front view showing a power transmission chain according to the present invention.
Figure 2:
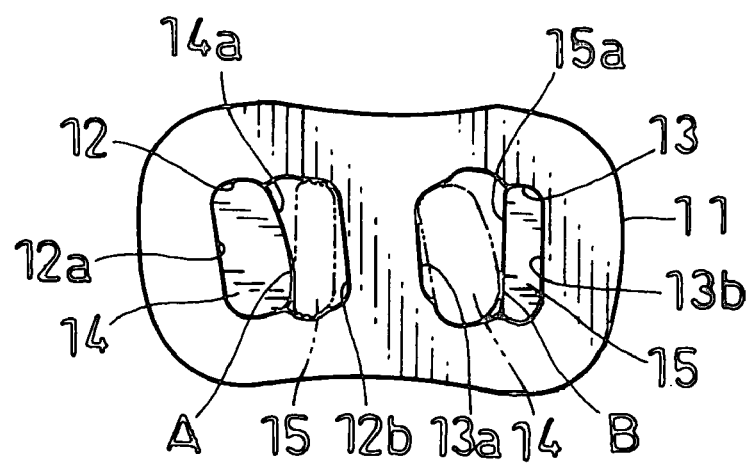
FIG. 2 is an enlarged side view of a link.

FIGS. 1 and 2 show a power transmission chain and a power transmission device according to the present invention. A power transmission chain (1) may include a plurality of links (11) having front and back insertion parts (12) and (13) which are disposed at predetermined intervals in a chain longitudinal direction; and a plurality of pins (14) and a plurality of interpieces (15) which are inserted through the links (11) and move in a rolling and contacting manner relatively; wherein the interpiece (15) is set to be shorter than the pin (14), and end faces of the pin (14) contact conical sheave faces (2c) and (2d) of a fixed sheave (2a) and a movable sheave (2b) of a pulley (2) in a state where end faces of the interpiece (15) do not contact respective conical sheave faces (2c) and (2d) of the pulley (2), and power is transmitted by a frictional force caused by this contact.

The pin (14) is formed by a link holding part (16) having an even sectional shape and the links (11) pressed therein and pulley abutting parts (17) and (18) formed at opposite ends of the link holding part (16) and having inclined surfaces (17a) and (18a) corresponding to the sheave faces (2c) and (2d) of the pulley (2). Then, the pin (14) is connected to the link (11) by pressing the upper and lower edges of the pin (14) into the upper and lower edges of the through hole (12) of the link (11).

As shown in FIG. 2, the front through hole (12) of the link (11) is formed by a pin fixing part (12a) on which the pin (14) (shown by a solid line) is fixed and an interpiece movable part (12b) to which the interpiece (15) (shown by a dashed-two dotted line) is movably fitted; and the back through hole (13) is formed by a pin movable part (13a) to which the pin (14) (shown by a dashed-two dotted line) is movably fitted and an interpiece fixing part (13b) on which the interpiece (15) (shown by a solid line) is fixed. Further, in FIG. 2, the parts shown by the reference marks A and B are lines (points on the sectional face) where the pin (14) and the interpiece (15) contact each other in the linear part of the chain (1), and the distance between A and B is considered as a pitch.

Figure 3:
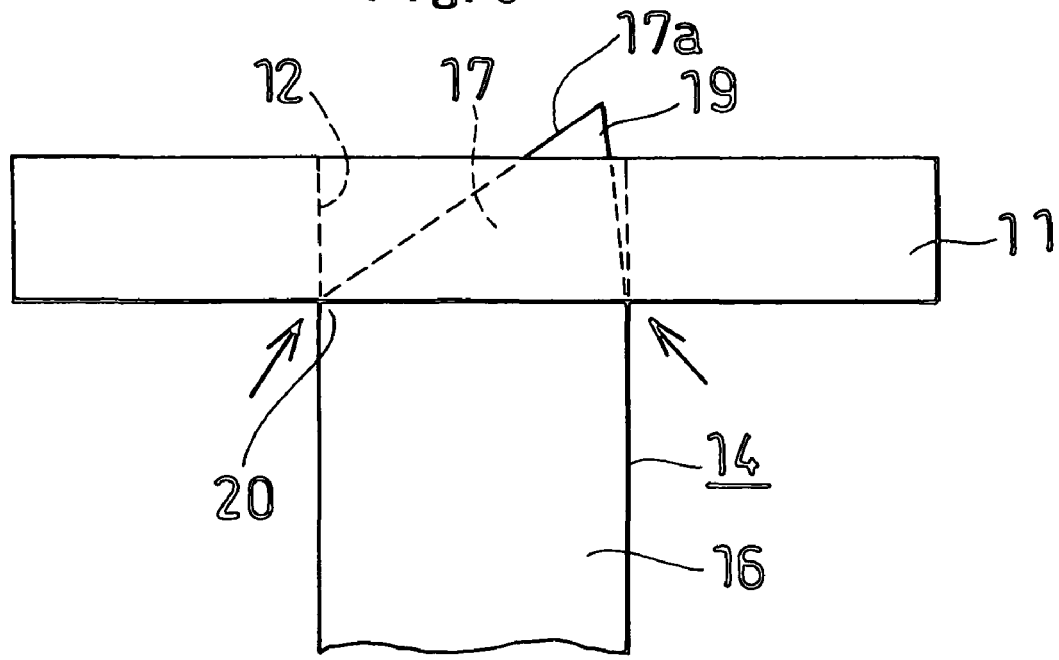
FIG. 3 is a view schematically showing a state where a pin is pressed into a link in a first embodiment.

FIG. 3 shows a state where the pin (14) is pressed into the link (11) in the present invention. The end of the pin (14) which is located at the front end side when the pint is pressed is formed in the shape so that the upper and lower edges of the pin (14) are pressed at the same time by deleting the upper edge of the pulley abutting part (17) which is located at the front end side when the pin (14) is pressed.

Figure 6:
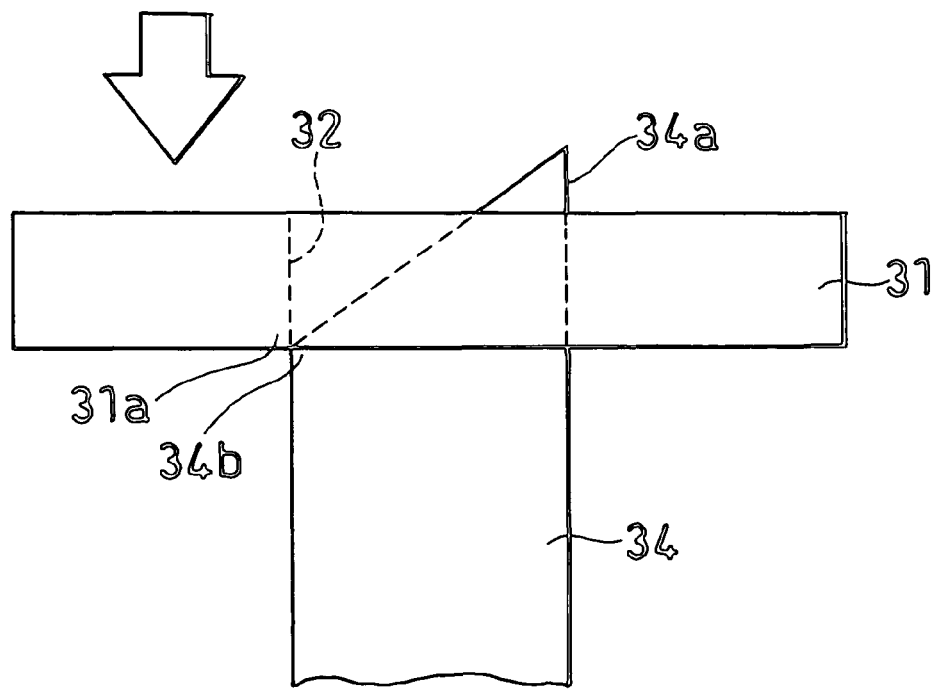
FIG. 6 is a view schematically showing a state where a conventional pin is pressed into a conventional link.

In other words, a front end upper edge (19) to be previously fitted in the through hole (12) of the link (11) when the pin is pressed and a front end lower edge (20) to be fitted in the through hole (12) of the link (11) in the last instance when the pin is pressed are located at the end of each pin (14), since its end faces are made into the inclined surfaces (17a) and (18a) corresponding to the shapes of the sheaves contacting the end faces. By making the front end upper edge (19) to be inclined, the pressing margin of the upper edge (19) of the front end located near the front end side rather than the front end lower edge (20) is defined as zero. Accordingly, concentration of stresses in (31a) of FIG. 6 is relaxed, and thereby, the link (11) is prevented from being transformed and trimmed; the strength of the link (11) is prevented from being lowered; and the generation amount of a friction powder is reduced. Further, a friction between the links (11) caused by these is reduced so as to enable to decrease a bending torque of the chain (1).

That is, the pin (14) has a width corresponding to the width of all of the through holes (12), the width being defined by side edges extending in a direction parallel to the length of said pin. The inclined surfaces (17a) are angled to contact the conical sheave faces, whereby one of the side edges at each end of each said pin is longer than the other of the side edges by a predetermined length related to a larger spacing between said conical sheave faces (2c-2d) at the one of the side edges as compared to the other of the side edges. The edge (19) of the longer one of the side edges is angled from the direction parallel to the length of the pin, such that the width of said pin at the predetermined length is less than the width of said through holes.

The pin (14) can be easily obtained by obtaining the pin having the same shape as the conventional one in the same method as the conventional method, and then, performing a polishing process so as to make the upper edge at the front end (19) into a no pressed part.

Figure 4:
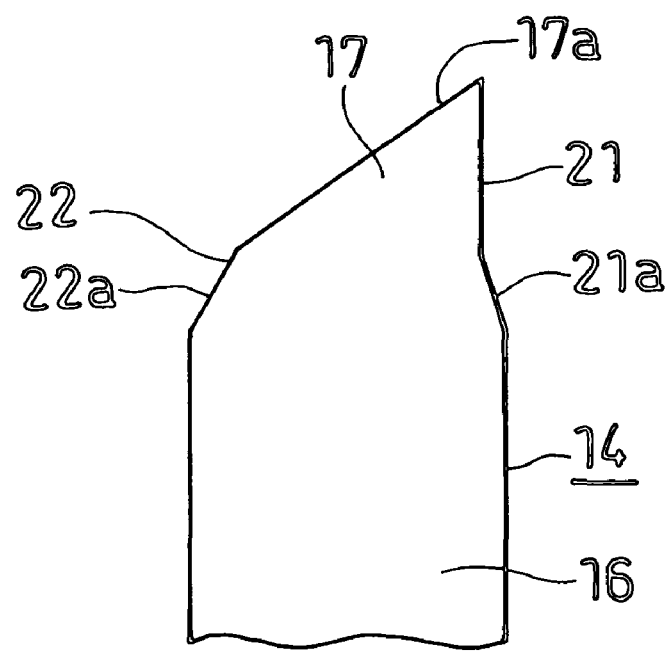
FIG. 4 is a view schematically showing a shape of a pin in a second embodiment.
Figure 5:
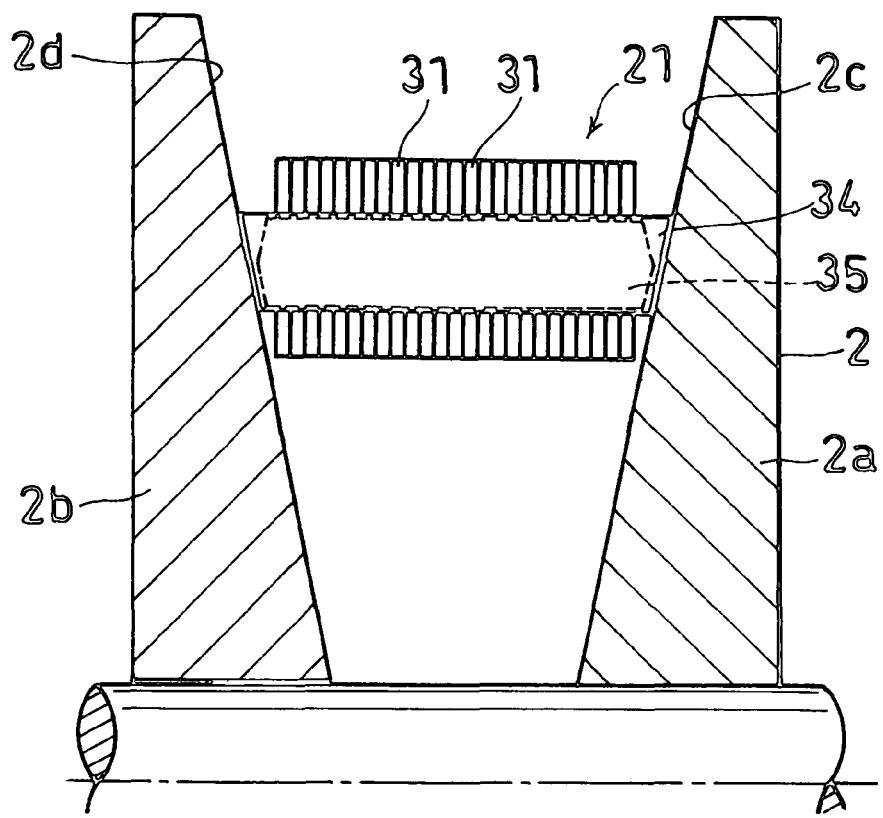
FIG. 5 is a front view showing a conventional power transmission chain.

In the pin (14) shown in the above-described FIG. 3, as compared to the conventional one, only the upper edge (19) of the front end is deleted in the inclined shape; however, the shape to be deleted is not limited to this and various modifications are possible if the upper and lower edges of the pin (14) are allowed to be pressed at the same time. For example, not only the upper edge at the front end of the pin (14) but also the lower edge at the front end may be deleted at the same time. An example is shown in FIG. 4. In FIG. 4, an inclined face (21a) having a pressing margin which gradually increases is provided at a border between an upper edge (21) of the pulley abutting part (17) which is located at the front end side when the pin is pressed and the upper edge of the link holding part (16), and an inclined face (22a) having a pressing margin which gradually increases is also provided at a border between a lower edge (22) of the pulley abutting part (17) which is located at the front end side when the pin is pressed and the lower edge of the link holding part (16). Thereby, a power acting on the inclined face (21a) located at the upper edge of the front end and a power acting on the inclined face (22a) located at the lower edge of the front end when the pin is pressed become approximately the same. As a result, the pin can be more easily pressed and concentration of stresses when the pin is pressed is relaxed. Further, the pin (14) according to the present embodiment can be obtained by polishing the inclined face (21a) located at the upper edge of the front end and the inclined face (22a) located at the lower edge of the front end by the same grind stone, so that this pin can be manufactured without increase in labor.

That is, each of the side edges joins an inclined face (21a) or (22a), such that the width of the pin at the predetermined length becomes less than the width of the through holes. The inclined face (21*a*) joins an upper edge (21) joined to the end edge (17*a*) and the inclined face (22*a*) also joins the end edge (17*a*).

The configuration of pressing can be also applied to a chain (a chain in which the lengths of the first pin and the second pin are the same and both of them contact the sheave faces) which transmits a power by contacting the sheave faces and includes the second pin instead of the above-described interpiece (15), and to other various types of power transmission chains.

What is claimed is:

1. A power transmission chain in a power transmission device having conical sheave faces, the power transmission chain comprising:
   a plurality of links having through holes, wherein the through holes of at least two of said links are aligned; and
   a pin inserted, along a direction parallel to the length of said pin, through each of said aligned through holes to connect the links, wherein each said pin has a width corresponding to the width of all of said through holes, the width being defined by side edges extending in the direction parallel to the length of said pin, wherein each said pin also has end edges at each longitudinal end of the pin, said end edges being generally angled by a first angle to contact the conical sheave faces, whereby one of the side edges at each longitudinal end of each said pin is longer than the other of the side edges by a predetermined length related to a larger spacing between said conical sheave faces at said one of the side edges as compared to the other of said side edges,
   wherein the one of said side edges is angled by a second angle from the direction parallel to the length of said pin at said predetermined length, wherein the second angle is opposite the first angle relative to the direction parallel to the length of said pin, such that the width of said pin is less than the width of said through holes over the entirety of said predetermined length, and
   wherein said pin extends through all of said through holes of said at least two of said links over the entirety of said predetermined length.

2. A power transmission chain in a power transmission device having conical sheave faces, the power transmission chain comprising:
   a plurality of links having through holes, wherein the through holes of at least two of said links are aligned; and
   a pin inserted, along a direction parallel to the length of said pin, through each of said aligned through holes to connect the links, wherein each said pin has a width corresponding to the width of all of said through holes, the width being defined by side edges extending in the direction parallel to the length of said pin, wherein each said pin also has end edges at each longitudinal end of said pin, said end edges being generally angled to contact the conical sheave faces, whereby one of the side edges at each longitudinal end of each said pin is longer than the other of the side edges by a predetermined length related to a larger spacing between said conical sheave faces at said one of the side edges as compared to the other of said side edges,
   wherein each of said side edges joins an inclined face adjacent each said longitudinal end, the inclined faces being angled from the direction parallel to the length of said pin such that the width of said pin at the predetermined length becomes less than the width of said through holes, wherein the inclined face joining the one of said side edges joins an upper edge joined to the end edge of said longitudinal end, and wherein the inclined face joining the other of said side edges joins the end edge of said longitudinal end.

3. The power transmission chain according to claim 2, wherein the upper edge extends in the direction parallel to the length of said pin.

* * * * *